United States Patent Office 3,100,380
Patented Aug. 13, 1963

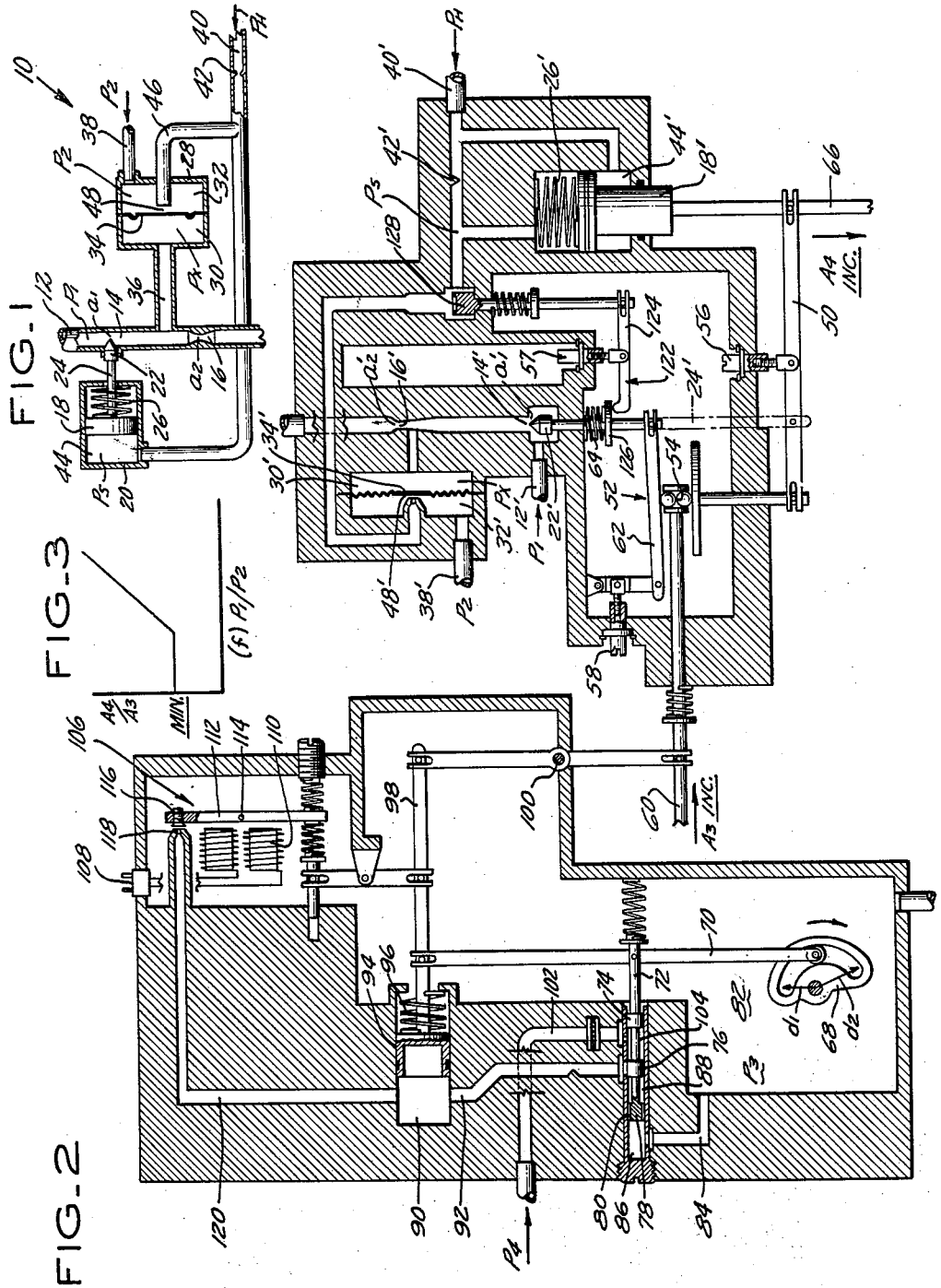
Aug. 13, 1963  T. P. FARKAS  3,100,380
DUAL INPUT DIVIDER CONTROLLER WITH LIMITER
UTILIZING SERVO ACTUATED PRESSURE
RATIO SENSOR
Original Filed June 4, 1957
INVENTOR
THOMAS P. FARKAS
BY *Vernon F. Hauschild*
ATTORNEY

3,100,380
DUAL INPUT DIVIDER CONTROLLER WITH LIMITER UTILIZING A SERVO ACTUATED PRESSURE RATIO SENSOR
Thomas P. Farkas, Bloomfield, Conn., assignor to United Aircraft Corporation, East Hartford, Conn., a corporation of Delaware
Continuation of application Ser. No. 663,491, June 4, 1957. This application Nov. 16, 1960, Ser. No. 70,103
2 Claims. (Cl. 60—97)

This is a continuation application of U.S. application Serial No. 663,491 and the invention relates to pneumatic pressure ratio sensing devices and more particularly to servo actuated pneumatic pressure ratio sensing devices which give a mechanical output indicative of the sensed pneumatic pressure ratio.

It is an object of this invention to teach a pressure ratio sensing device for a pneumatic system which is servo operated.

It is a further object of this invention to teach a pressure ratio sensing device comprising two orifices in series in a pneumatic flow system, one being a fixed area and one being a variable area and the latter being servo actuated and wherein the downstream orifice is choked and the upstream orifice may or may not be choked.

It is a further object of this invention to teach a servo actuated pressure ratio sensing device for a pneumatic system and which is capable of sensing the pressure ratio between gases of two different systems and which is also capable of utilizing parameter outputs from different control units and integrating the outputs in a definite proportion, and of providing a minimum proportion limiter.

Other objects and advantages will be apparent from the following specification and claims, and from the accompanying drawings which illustrate an embodiment of the invention.

In the drawings:

FIG. 1 is a simple showing of my servo actuated pneumatic pressure sensing device.

FIG. 2 represents a practical embodiment of this device in which servo units produce linear parameter outputs which are combined through a divider unit to actuate the variable area restriction in my pneumatic pressure ratio sensor.

FIGURE 3 is a graphic representation of the parameter proportion generated by the embodiment illustrated in FIG. 2 plotted against a sensed pneumatic pressure ratio and illustrating the minimum proportion.

My invention will be described as a pneumatic system throughout and it will be clear to those skilled in the art that this describes any gas which is capable of operating at a critical pressure ratio across a restriction to attain sonic flow therethrough and hence a choked condition therein could be used.

FIG. 1 illustrates the basic principle of my servo actuated pneumatic pressure ratio sensor while FIG. 2 illustrates a practical and particular embodiment thereof.

First referring to FIG. 1, the pneumatic pressure ratio to be sensed is $P_1/P_2$. Pneumatic pressure $P_1$, which may be constant or subject to variation, enters line 12 of servo actuated pneumatic pressure ratio sensor unit 10 and passes through variable area restriction 14, which may be choked or unchoked, and then through fixed area choked restriction 16. Air flow through a sharp edged orifice under conditions to create a minimum pressure ratio of 1.89 thereacross will cause sonic flow and hence a choked condition while the formula $$\frac{P_1}{P_2} = \left(\frac{2}{K+1}\right)^{\frac{K}{1-K}}$$

where K equals the fluid specific heat at constant pressure divided by the fluid specific heat at constant volume, will provide the critical pressure ratio for any compressible gas as explained on pages 281 and 299 of Fluid Mechanics, by R. C. Binder, Third Edition. The significance of having orifice 16 choked is that flow therethrough is unaffected by pressure variations downstream thereof. Servo piston 18, located within cylinder 20, is attached to variable area valve 22 through rod 24. Spring 26 performs the function of biasing servo piston 18 in a direction such that variable area valve 22 is normally in its full open position. Multi-cavity diaphragm chamber 28 is provided and is illustrated, for purposes of description simplification, as comprising chambers 30 and 32 separated by flexible diaphragm 34. Line 36 places chamber 30 into communication with duct 12 between restrictions 14 and 16. Pneumatic pressure $P_2$, which may be constant or subject to variation, is directed into chamber 32 through line 38. A third pneumatic pressure or pressure source, the supply pressure $P_H$, passes through line 40, through fixed orifice 42 and then to servo chamber 44 where it provides a force tending to close variable area valve 22 and area $a_1$ in opposition to spring 26. Bleed line 46 stems from servo pressure line 40 and terminates adjacent diaphragm 34 to form servo valve 48 therewith. The area of servo valve 48 and the flow therethrough is governed by the position of diaphragm 34 and since servo valve 48 bleeds air from servo pressure line 40, the diaphragm position and servo valve flow determine the pressure in servo chamber 44 and hence the variable area restriction or valve closing force.

The principle involved in the system shown in FIG. 1 includes sensing the desired pressure ratio and establishing a mechanical output signal representative thereof, including directing one of the pneumatic pressures to be sensed, $P_2$, to one side of a diaphragm 34 and passing the other pneumatic pressure to be sensed, $P_1$, through a line having two restrictions, the area of which is variable, preferably including a fixed and a variable area restriction with the downstream orifice choked, so as to establish a reference pressure, $P_X$, between these restrictions which will be directed to the opposite side of the diaphragm 34 from $P_2$. A servo unit such as 18 is provided to actuate variable area restriction or valve 22 and area $a_1$ independent of any attachment to flexible diaphragm 34, thereby avoiding the problems of flow and movement hindrances encountered in any flow system and further avoiding the problem involved in attempting to have the valve diaphragm actuated after diaphragm flexibility weakens at high temperatures. Because pressures $P_X$ and $P_2$ are on opposite sides of diaphragm 34, they will be substantially equal and the size and flow through bleed line 46 is chosen to be such that it will have little or no effect upon pressure $P_2$.

My invention teaches a pneumatic servo construction in which orifice 16 is choked and the area $a_1$ of orifice 14 varies as a function of the pressure ratio $P_1/P_2$ in such a manner that for each pressure ratio $P_1/P_2$, there will be a unique value of $a_1$. This is true whether orifice 14 is choked or unchoked but the relationship between $a_1$ and $P_1/P_2$ is different for the choked and unchoked conditions. For example, when orifice 14 is choked, we may write the following weight flow equation of the gas passing therethrough:

For orifice 14: $W_1 = K_1 a_1 P_1$     (1)

and

For orifice 16: $W_2 = K_2 a_2 P_2$     (2)

As the weight flow through both orifices will be the same, from Equations 1 and 2 we arrive at the equation:

$K_1 a_1 P_1 = K_2 a_2 P_2$     (3)

Solving for $a_1$ we obtain:

$$a_1 = \frac{K_2 a_2 P_2}{K_1 P_1} \qquad (4)$$

As $a_2$ is also a constant we may express $K_2 a_2 / K_1$ as $C_1$, which leads to:

$$a_1 = C_1 P_2 / P_1 \qquad (5)$$

or:

$$a_1 = f(P_1/P_2) \qquad (6)$$

The constant $K_1$ and $K_2$ are proportional to the discharge coefficients of the respective orifices. Two orifices of similar geometery will have equal coefficients. If this is the case, then Equation 3 may be written as:

$$a_1 P_1 = a_2 P_2 \qquad (7)$$

which is the equation given in line 16, page 3 of the referenced application. It is accordingly seen that when both orifices 14 and 16 are choked, area $a_1$ varies as a function of pressure ratio $P_1/P_2$. Considering the case where orifice 14 is not choked, the weight flow through $a_1$ may be given as:

$$W_1 = K_1' a_1 \sqrt{P_2(P_1 - P_2)} \qquad (8)$$

Equation 8 is a slight approximation, however, the conclusions drawn using this equation are the same as those following use of a rigorous expression for $W_1$. Squaring Equation 8 and Equation 2 and equating the resulting $W_1^2$ and $W_2^2$, we obtain:

$$(K_1')^2 a_1^2 (P_1 P_2 - P_2^2) = K_2^2 a_2^2 P_2^2 \qquad (9)$$

By transposing we arrive at the equation:

$$\frac{1}{a_1^2} = \frac{(K_1')^2}{K_2^2 a_2^2} \frac{(P_1 P_2 - P_2^2)}{P_2^2} \qquad (10)$$

$$\frac{1}{a_1} = \frac{K_1'}{K_2 a_2} \sqrt{P_1/P_2 - 1} \qquad (11)$$

Substituting $C_2$ for $K_1'/K_2 a_2$, we obtain:

$$\frac{1}{a_1} = C_2 \sqrt{P_1/P_2 - 1} \qquad (12)$$

and $$a_1 = f(P_1/P_2) \qquad (13)$$

Hence, when orifice 14 is unchoked and orifice 16 is choked, area $a_1$ varies as a function of pressure ratio $P_1/P_2$. It will therefore be seen from Equations 6 and 13 that there is a unique area $a_1$, and therefore a unique position of piston 18 for each pressure ratio $P_1/P_2$ when orifice 16 is choked, whether orifice 14 is choked or unchoked. In a pneumatic system the minimum pressure ratio across an orifice for the orifice to be choked is:

$$(P_1/P_2)_{critical} = \left(\frac{2}{K+1}\right)^{\frac{k}{1-k}} \qquad (14)$$

where:

$$k = \frac{C_p}{C_v} = \frac{\text{fluid specific heat at constant pressure}}{\text{fluid specific heat at constant volume}}$$

$$(15)$$

From Equation 7, it can be seen that for the condition where orifice 14 is choked:

$$a_1 = \frac{a_2}{(P_1/P_2)} \qquad (16)$$

Therefore, for the choked condition:

$$a_1 \leq \frac{a_2}{(P_1/P_2)_{critical}} \qquad (17)$$

and for the unchoked condition:

$$a_1 \geq \frac{a_2}{(P_1/P_2)_{critical}} \qquad (18)$$

For example, if the gas is air:

$$(P_1 P_2)_{critical} = 1.89 \qquad \frac{1}{(P_1/P_2)_{critical}} = 0.53$$

So for orifice 14 to be choked $a_1 \leq 0.53 a_2$, and for orifice 14 to be unchoked $a_1 \geq 0.53 a_2$. Flow duct 12, shown in FIGURE 1 of referenced application and flow duct 12', shown in FIGURE 2 of referenced application, both lead to drain. In order for orifice 16 to be choked, as is necessary in the operation of this servo device, the pressure ratio $P_2/P_{drain}$ must be at least that as defined by Equation 14. For air this would be $P_2/P_{drain} = 1.89$. However, if orifice 16 is of venturi shape as shown in both FIGURE 1 and FIGURE 2 of this application, then the critical pressure ratio of Equation 14 must exist between $P_2$ and the pressure at the throat of the venturi, and the pressure ratio $P_2/P_{drain}$ may be as low as 1.2 for air. This increases the effective range of the device. Further, since $a_1$ is determined by the position of piston 18, we may calibrate a scale so that the position of piston 18 indicates area $a_1$ and hence the pressure ratio $P_2/P_1$. This is accomplished by varying servo actuating pressure $P_s$ in chamber 44 through the bleed action of servo valve 48 as a function of the movement of diaphragm 34, which is responsive to changes in the $P_2/P_1$ ratio. More particularly, as shown in FIG. 1 there are three input pressures $P_1$, $P_2$, and $P_H$. Two additional pressures $P_x$ and $P_s$ are dependent on the controlling interaction of servo valve 48 and servo piston 18. Diaphragm 34 in chamber 28 may be considered to be in equilibrium, at its null position, when $P_x = P_2$. When $P_x \neq P_2$ the position (opening) of servo valve 48 will change. As the pressure $P_s$ is a function of fixed orifice 42 and servo valve opening 48, $P_s$ will change when $P_x \neq P_2$ and will cause servo piston 18 to change position. The valve of $a_1$ is determined by the position of servo piston 18 and the ratio $P_1/P_x$ is determined by $a_1$, hence the control action will continue until $P_x = P_2$. For a given $P_2$, hence a given $P_x$, the position of $a_1$ will be dependent on the value of $P_1$, and this dependence is such that position $a_1$ is unique for every value of the pressure ratio $P_1/P_2$ as previously demonstrated.

In addition to sensing pressure ratio, a unit of the type shown in FIG. 1 may be used to control a pressure ratio by utilizing the movement of servo piston 18 to operate a device which performs the function of controlling the pressure ratio to a degree proportionate to the movement of servo piston 18. For example, the movement of servo piston 18 may be utilized in a system to vary the pressure $P_1$ possibly by controlling the position of the exhaust nozzle of a jet engine.

FIG. 2 represents a preferred and practical embodiment of my invention and may be used to govern two control means in response to a pneumatic pressure ratio, such as $P_1/P_2$ referred to in FIG. 1.

It will be noted that if phantom link 24' were provided in FIG. 2 and pivotally attached to pivotable bar 50, we would have the unit shown in FIG. 1 with pneumatic pressure $P_2$ entering chamber 32' through line 38' and pneumatic pressure $P_1$ entering duct 12' and passing through variable orifice area 14' and then through fixed orifice 16 and providing pneumatic pressure $P_x$ to chamber 30' which is on the opposite side of diaphragm 34' from chamber 32'. Pneumatic supply pressure $P_H$ enters line 40' and enters chamber 44' of servo piston 18' to move the piston upwardly in opposition to spring 26'. Pressure $P_s$ in chamber 26' is governed by the amount of bleed flow discharged into chamber 32' through servo valve 48'. By using the same equations discussed in connection with FIG. 1, it will be obvious that the position of variable area valve 22' and the movement of piston 18' will be proportional to the pressure ratio $P_1/P_2$.

The embodiment shown in FIG. 2 is intended to demonstrate a more extensive use of my invention and therefore, phantom line 24' is not attached to pivotable lever 50 but servo piston 18 is used to produce dimension $A_4$ which will be united through divider unit 52 with the dimension $A_3$ such that variable area valve 22' will be positioned as a function of dimensions $A_4$ and $A_3$. The movement of shafts 66 ($A_4$) and 60 ($A_3$) will preferably be fed to controls which change any parameter, such as temperature, pressure or area in accordance with the movements of these shafts.

As shown, the equation to be followed by this FIG. 2 arrangement may be stated as $$\frac{A_4}{A_3} = K\frac{P_1}{P_2}$$

As already described, dimension $A_4$ is produced by servo piston 18′ and is provided to divider 52 to be joined with dimension $A_3$ to vary the position of divider fulcrum point 54 and thereby position movable valve 22′ as a function of $A_4/A_3$. It is well known that constants such as K can be introduced into the system by any means, such as by varying linkage lengths or by varying the various pivot adjustments such as 56, 57 and 58.

It will be noted by reference to FIG. 2 that a downward movement of servo piston 18′ constitutes an increase of signal of dimension $A_4$ while a rightward movement of lever 60 produces an increase of dimension $A_3$. Further, the rightward movement of lever 60 would cause fulcrum point 54 to move to the right such that linkage bars 62 would be permitted to rotate clockwise in response to the urging of spring 64, thereby increasing area $a_1'$ to increase pressure $P_X$ and therefore pressure $P_S$, while a downward movement of lever 66, attached to servo piston 18′, would produce the opposite effect.

Considering the portion of the control which provides the $A_3$ dimension, it will be noted that a movable cam 68 actuates one end of pivotable bar 70 and that dimension $d_1$ of cam 68 is less than dimension $d_2$ of cam 68 such that a clockwise movement of cam 68 moves linkage 70 to the left while a counter-clockwise movement of cam 68 moves linkage 70 to the right. Linkage 70 positions pilot valve 72 which comprises three lands 74, 76 and 78, the latter of which is provided with grooves 80 which permit relatively low pressure $P_3$ to pass from chamber 82 through line 84 and thence into chambers 86 and 88. In the pilot valve position shown in FIG. 2, the valve is shown to be centered or in a neutral position so that pressure $P_3$ cannot proceed beyond land 76. A counter-clockwise movement of cam 68 would move both land 78 and land 76 to the right thereby permitting servo chamber 90 to drain to the pressure $P_3$ through line 92. Pressure $P_3$ is selected to be of such a value that it will be overcome by spring 96 and servo piston 94 will move to the left thereby moving linkage 98 to the left and linkage bar 60 to the right in view of pivot point 100 to increase dimension $A_3$.

The movement of cam 68 clockwise will move lever 70 and pilot valve 72 to the left thereby introducing a relatively higher pressure $P_4$ through line 102 to chamber 90 through chamber 104 and line 92. Pressure $P_4$ is selected to be of such a value that it will overcome spring 96 and move lever 98 to the right thereby decreasing dimension $A_3$. It will be noted that the movement of servo piston 94 in response to pressures $P_3$ and $P_4$ serves to return pilot valve 72 to its neutral position as shown in FIG. 2. In this fashion, bar 60 serves to vary dimension $A_3$ and also to move divider 52 and pivot point 54 in a plane along the axis of shaft 60.

An overriding unit 106 may be used to bleed chamber 90 in response to a temperature, pressure or other reading. For instance, if there is a particular temperature limit which should not be exceeded, this temperature may be sensed by probe 108 and fed to proportioning solenoid 110 to act upon pivotable lever 112 which pivots about pivot point 114 to move plunger 116 away from bleed jet 118 thereby permitting or increasing flow through line 120 to reduce the pressure in chamber 90 thereby increasing the dimension $A_3$.

Divider 52 which is based upon the similar triangle principle, combines the movement of servo piston 18′, which represents dimension $A_4$, and the movement of servo piston 94 which represents dimension $A_3$ to produce a motion to variable area valve 22′ which represents the proportion $A_4/A_3$.

In many instances, it may be desirable to vary the dimension $A_4/A_3$ in the fashion shown in the graph in FIG. 3 such that it does not reduce below a preselected minimum value. This is accomplished by providing servo stop 122 which consists of a linkage bar 124, one end of which is positioned to contact plate 126 of valve 22′, while the other end positions valve 128. When the parameter $A_4/A_3$ reaches the predetermined minimum, as shown in FIG. 3, plate 126 contacts lever arm 124 causing the lever arm to rotate in a counterclockwise direction and reduce the area of valve 128 to increase the pressure $P_S$ to prevent further lowering of the dimension $A_4/A_3$. Obviously, a maximum ratio control could also be used.

While not necessarily so limited, the embodiments shown in FIG. 2 could represent control actuators to position the convergent section of a convergent-divergent nozzle of the type used in modern aircraft turbojet engines as a function of dimension $A_3$ and to vary the divergent section as a function of the dimension $A_4$ according to a pressure ratio curve such as shown in FIG. 3.

While particular embodiments of this invention have been shown for purposes of illustration, it should be borne in mind that other arrangements, consistent with the teaching herein, will be obvious to those skilled in the art.

I claim:

1. A control system comprising a first means including a duct defining a gas passage, a fixed area restriction in said gas passage, a variable area restriction in said gas passage and located upstream of said fixed area restriction, means to pass gas through said duct thereby establishing a first pressure upstream of said restrictions and a reference pressure which is a function of said first pressure between said restrictions and to establish choked flow through said fixed area restriction, a double chamber diaphragm unit comprising a first chamber communicating with said reference pressure, a second pneumatic pressure in communication with a second chamber of said diaphragm unit which second chamber is independent of said duct and coacting with said reference pressure to position said diaphragm as a function of the pressure ratio between said first and second pressures, and servo means responsive to diaphragm movement to produce a first linear parameter output proportional to said pressure ratio, second means including a spring biased servo piston, a pilot valve to selectively provide actuating pressures to said servo piston, means to actuate said pilot valve so that said servo piston is moved to produce a second linear parameter output, and means including a divider to combine said first and second outputs proportionately and position said first means variable area restriction to maintain a selected proportion between said first and second outputs proportional to said pressure ratio, and means to maintain said proportion above a preselected limit.

2. A control system comprising a first means including a duct defining a gas passage, a fixed area restriction in said gas passage, a variable area restriction in said gas passage and located upstream of said fixed area restriction, means to pass gas through said duct thereby establishing a first pressure upstream of said restrictions and a reference pressure which is a function of said first pressure between said restrictions and to establish choked flow through said fixed area restriction, a double-chamber diaphragm unit comprising a first chamber communicating with said reference pressure, a second pneumatic pressure in communication with a second chamber of said diaphragm unit which second chamber is independent of said duct and coacting with said reference pressure to position said diaphragm as a function of the pressure ratio between said first and second pressures, and servo means responsive to diaphragm movement to produce a first linear parameter output proportional to said pressure ratio, a second servo actuated means to produce a second linear parameter output, and means including a divider to combine said first and second outputs proportionately and position said first means variable area restriction to maintain a selected proportion between said first and second outputs proportional to said pressure ratio, and means to maintain said proportion above a preselected limit.

References Cited in the file of this patent

UNITED STATES PATENTS

| | | |
|---|---|---|
| 2,499,232 | Strub | Feb. 28, 1950 |
| 2,619,794 | Lombard | Dec. 2, 1952 |
| 2,846,843 | Clark | Aug. 12, 1958 |
| 2,873,576 | Lombard | Feb. 17, 1959 |
| 2,917,061 | Longfellow | Dec. 15, 1959 |
| 2,923,127 | Biehl | Feb. 2, 1960 |
| 2,981,058 | Reed | Apr. 25, 1961 |

FOREIGN PATENTS

| | | |
|---|---|---|
| 736,003 | Great Britain | Aug. 31, 1955 |